(12) United States Patent
Schlegel (10) Patent No.: US 6,186,468 B1
(45) Date of Patent: Feb. 13, 2001

(54) MOUNTING PAD APPARATUS FOR SUPPORTING AND MOVING AN ELECTRICAL POWER TRANSFORMER WHILE POSITIONED THEREON

(75) Inventor: Robert R. Schlegel, Cranbury, NJ (US)

(73) Assignee: PenCell Plastics, Inc., New Egypt, NJ (US)

( * ) Notice: Under 35 U.S.C. 154(b), the term of this patent shall be extended for 0 days.

(21) Appl. No.: 09/191,092

(22) Filed: Nov. 12, 1998

(51) Int. Cl.$^7$ .................................................. F16M 1/00
(52) U.S. Cl. ................ 248/678; 248/346.01; 248/346.02
(58) Field of Search ............................ 248/678, 346.01, 248/346.02, 346.5, 176.1; 108/901, 57.25, 51.11

(56) References Cited

U.S. PATENT DOCUMENTS

| | | | |
|---|---|---|---|
| D. 393,518 | 4/1998 | Hampel | D34/38 |
| D. 411,509 * | 6/1999 | Schlegel | D13/118 |
| 3,677,200 * | 7/1972 | Coccagna et al. | 108/58 |
| 3,699,901 * | 10/1972 | Cook, III | 108/58 |
| 3,713,620 | 1/1973 | Tkach | 248/19 |
| 3,722,845 | 3/1973 | Unger | 248/346 |
| 3,841,032 | 10/1974 | Grannis, III | 52/27 |
| 3,962,660 | 6/1976 | Duckett | 336/65 |
| 4,023,755 | 5/1977 | Alesi, Jr. | 248/19 |
| 4,050,659 | 9/1977 | McCannon et al. | 248/19 |
| 4,056,251 | 11/1977 | Dixon et al. | 248/19 |
| 4,075,395 | 2/1978 | Ohnishi | 428/542 |
| 4,189,125 | 2/1980 | Little | 248/346 |
| 4,212,446 | 7/1980 | Domanick et al. | 248/678 |
| 4,213,111 | 7/1980 | Lux, Jr. | 336/65 |
| 4,267,399 | 5/1981 | Lux, Jr. | 174/1 |
| 4,287,836 * | 9/1981 | Aoki | 108/51.1 |
| 4,505,449 | 3/1985 | Turner et al. | 248/669 |
| 4,533,786 | 8/1985 | Borgmeyer et al. | 174/50 |
| 4,556,758 | 12/1985 | Warden | 174/50 |
| 4,559,699 | 12/1985 | Owen et al. | 29/602 R |
| 4,742,781 * | 5/1988 | Shuert | 108/53.3 |
| 4,869,456 | 9/1989 | Jacobs | 248/678 |
| 4,883,918 | 11/1989 | Browning | 174/1 |
| 4,930,632 * | 6/1990 | Eckert et al. | 206/386 |
| 4,937,563 | 6/1990 | Shekita et al. | 340/700 |
| 4,946,725 | 8/1990 | Harlan | 428/73 |
| 4,963,696 | 10/1990 | Owen et al. | 174/50 |
| 5,087,875 | 2/1992 | Balch et al. | 324/157 |
| 5,333,830 | 8/1994 | Miller | 248/679 |
| 5,401,456 | 3/1995 | Alesi, Jr. et al. | 248/511 |
| 5,505,141 * | 4/1996 | Barber | 108/51.1 |
| 5,547,161 | 8/1996 | Gleich et al. | 248/678 |
| 5,664,394 | 9/1997 | Sweeney | 52/782.1 |
| 5,686,696 | 11/1997 | Baker, Jr. et al. | 174/50 |

(List continued on next page.)

Primary Examiner—Ramon O. Ramirez
Assistant Examiner—Kimberly Wood
(74) Attorney, Agent, or Firm—Sperry, Zoda & Kane (57) ABSTRACT

An improved mounting pad apparatus is disclosed made of a plastic material for supporting an electrical power transformer and maintaining it spaced from the surrounding ambient ground environment which is usually turf. The mounting pad is formed of a load supporting deck positioned upon a cellular subframework with side walls extending therearound and a base flange extending outwardly therefrom for stability. One more rigid bars are selectively positionable within various slots defined in the cellular subframework for strengthening and stiffening thereof in various orientations. These rigid bars can extend parallel or perpendicular with respect to one another for various applications where different types of strengthening parameters are required. The cellular subframework also selectively can define a plurality of forklifting slots which can extend therethrough and through the side walls to facilitate lifting and movement of the mounting pad apparatus even with a normally quite heavy electrical power transformer positioned thereon. Multiple forklifting slots can be defined by the cellular subframework at various orientations with respect to one another to facilitate use thereof in relatively inaccessible locations.

16 Claims, 4 Drawing Sheets

U.S. PATENT DOCUMENTS

| | | | |
|---|---|---|---|
| 5,728,458 | 3/1998 | Sweeney | 428/12.4 |
| 5,739,464 | 4/1998 | Adkins et al. | 174/50 |
| 5,745,973 | 5/1998 | Kohlhaas | 29/432 |
| 5,758,855 | 6/1998 | Jordan et al. | 248/346.01 |
| 5,778,801 | 7/1998 | Delacour | 108/57.25 |
| 5,784,971 | 7/1998 | Chang | 108/51.3 |
| 5,791,262 | 8/1998 | Knight et al. | 108/51.25 |
| 5,833,207 * | 11/1998 | Hagenhoff et al. | 248/678 |
| 5,890,437 * | 4/1999 | Hill | 108/51.3 |
| 5,934,638 * | 8/1999 | Provot | 248/346.02 |
| 5,961,093 * | 10/1999 | Jones et al. | 248/678 |

* cited by examiner

MOUNTING PAD APPARATUS FOR SUPPORTING AND MOVING AN ELECTRICAL POWER TRANSFORMER WHILE POSITIONED THEREON

BACKGROUND OF THE INVENTION

1. Field of the Invention

The present invention deals with the field of mounting pads used for supporting large pieces of equipment in external environments normally positioned on ground, earth, turf, grass, cement, asphalt or other similar common ambient substrates. Such mounting pads are preferably formed of a plastic material to maintain electrical isolation between the equipment and ground and also to maintain the equipment spaced upwardly from the ground to prevent ambient water from rainfall or minimal flooding from damaging the electrical equipment.

Such mounting pads are most commonly used to support electrical power transformers which are used currently in commonplace applications such as residential areas. Such residential areas currently utilize underground electrical wiring and the mounting pads normally provide a means to allow the electrical power transformer to have access directly to the ground immediately therebelow to pass wires and the like from the transformer to the ground while at the same time maintaining the electrical power transformer out of contact with ground and water and other external deteriorating influences that are commonplace in such ambient environments. Since most residential areas currently being constructed utilize underground electrical wiring such mounting pads are becoming increasingly more common in usage throughout the United States and elsewhere.

2. Description of the Prior Art

The present invention provides an improved apparatus for a mounting pad used for supporting and moving an electrical power transformer while positioned thereon and is distinguishable from the many prior art devices such as those shown in U.S. Pat. No. 3,713,620 patented Jan. 30, 1973 to G. Tkach on a "Machine Supporting Slab"; and U.S. Pat. No. 3,722,845 patented Mar. 27, 1973 to R. Unger on a "Ground Mounting Base For Central Air Conditioner Heat Exchanger Units"; and U.S. Pat. No. 3,841,032 patented Oct. 15, 1974 to C. Grannis, III and assigned to A.B. Chance Company on an "Article And Screw Anchor-Supported, Load-Bearing Pad Therefor"; and U.S. Pat. No. 3,962,660 patented Jun. 8, 1976 to D. Duckett and assigned to RTE Corporation on a "Pallet Pad For Transformers And Transformer Affixed Thereon"; and U.S. Pat. No. 4,023,755 patented May 17, 1977 to J. Alesi, Jr. and assigned to Formex Manufacturing, Inc. on a "Transformer Mounting Pad"; and U.S. Pat. No. 4,050,659 patented Sep. 27, 1977 to R. McCannon et al on a "Transformer Pad"; and U.S. Pat. No. 1,056,251 patented Nov. 1, 1977 to J. Dixon et al on a "Lightweight Pad For Semi-Rigidly Supporting Electrical Transformers"; and U.S. Pat. No. 4,075,395 patented Feb. 21, 1978 to M. Ohnishi and assigned to Matsuchita Electric Industrial Co., Ltd. on a "Hybrid Framework Consisting Of Metallic Plate And Projections Made Of Synthetic Resin"; and U.S. Pat. No. 4,189,125 patented Feb. 19, 1980 to J. Little on "Ground Support Pads For Mobile Structures"; and U.S. Pat. No. 4,212,446 patented Jul. 15, 1980 to E. Domanick et al and assigned to Johns-Manville on a "Universal Mounting Pad For Electrical Transformers"; and U.S. Pat. No. 4,213,111 patented Jul. 15, 1980 to R. Lux, Jr. and assigned to Thermodynamics Corporation on a "Ground Level Transformer Unit"; and U.S. Pat. No. 4,267,399 patented May 12, 1981 to R. Lux, Jr. and assigned to Thermodynamics Corporation on a "Transformer Pad With Cable Protective Sleeve"; and U.S. Pat. No. 4,505,449 patented Mar. 19, 1985 to G. Turner et al and assigned to Diversitech Corporation on a "Lightweight Concrete Cladded Heavy Equipment Base"; and U.S. Pat. No. 4,533,786 patented Aug. 6, 1985 to V. Borgmeyer et al and assigned to Westinghouse Electric Corp. on a "Padmounted Transformer Enclosure"; and U.S. Pat. No. 4,556,758 patented Dec. 3, 1985 to G. Warden and assigned to Westinghouse Electric Corp. on a "Padmounted Transformer"; and U.S. Pat. No. 4,559,699 patented Dec. 24, 1985 to T. Owen et al and assigned to Westinghouse Electric Corp. on a "Method Of Constructing A Padmounted Distribution Transformer"; and U.S. Pat. No. 4,869,456 patented Sep. 26, 1989 to S. Jacobs and assigned to Carson Industries, Inc. on a "Load Supporting Pad"; and U.S. Pat. No. 4,883,918 patented Nov. 28, 1989 to R. Browning and assigned to Formex Manufacturing, Inc. on a "Transformer Mounting Pad Having A Cable Opening Lined with Safety Barrier"; and U.S. Pat. No. 4,937,563 patented Jun. 26, 1990 to G. Shekita et al and assigned to International Business Machines Corporation on a "Positioning Scheme For Multiple Mounting Positions Of Input/Output Devices"; and U.S. Pat. No. 4,946,725 patented Aug. 7, 1990 to S. Harlan and assigned to Homac Mfg. Company on "Equipment Support Pad And Method"; and U.S. Pat. No. 4,963,696 patented Oct. 16, 1990 to T. Owen et al and assigned to ABB Power T&D Company, Inc. on a "Tamper Resistant Padmounted Transformer"; and U.S. Pat. No. 5,087,875 patented Feb. 11, 1992 to R. Balch et al and assigned to General Electric Company on an "Isolated High Voltage Transformer For Electric Power Meter"; and U.S. Pat. No. 5,333,830 patented Aug. 2, 1994 to F. Millen and assigned to Pacolet Concrete Company on a "Composite Equipment Support Pad"; and U.S. Pat. No. 5,401,456 patented Mar. 28, 1995 to J. Alesi, Jr. et al and assigned to Formex Manufacturing, Inc. on a "Method Of Forming A Plastic Unit Having An Outer Plastic Shell Encapsulating A Foam Core"; and U.S. Pat. No. 5,547,161 patented Aug. 20, 1996 to W. Gleich et al and assigned to Bowe Systec AG on a "Base For Machines And The Like"; and U.S. Pat. No. 5,664,394 patented Sep. 9, 1997 to J. Sweeney and assigned to DiversiTech Corporation on a "Base For Equipment"; and U.S. Pat. No. 5,686,696 patented Nov. 11, 1997 to J. Baker, Jr., et al on a "Transformer Pad"; and U.S. Pat. No. 5,728,458 patented Mar. 17, 1998 to J. Sweeney and assigned to DiversiTech Corporation on a "Light-Weight High-Strength Composite Pad"; and U.S. Pat. No. 5,739,464 patented Apr. 14, 1998 to H. Adkins et al and assigned to ABB Power T&E) Company Inc. on a "Padmounted Transformer Enclosure And Latch"; and U.S. Des. Pat. No. Des.393,518 patented Apr. 14, 1998 to L. Hampel and assigned to L.T. Hampel Corp. on a "Pallet"; and U.S. Pat. No. 5,745,973 patented May 5, 1998 to F. Kohlhaas on a "Pallet Assembly"; and U.S. Pat. No. 5,758,855 patented Jun. 2, 1998 to R. Jordan et al and assigned to Cadillac Products, Inc. on a "Pallet With Flexible Tensile Reinforcement And Method For Making The Same"; and U.S. Pat. No. 5,778,801 patented to F. Delacour on Jul. 14, 1998 on a "Forklift Pallet Made Of Plastics Material, and Method Of Manufacture"; and U.S. Pat. No. 5,784,971 patented Jul. 28, 1998 to W. Chang and assigned to Cheng Loong Corporation on a "Pallet Structure Improvement"; and U.S. Pat. No. 5,791,261 patented Aug. 11, 1998 to M. John et al and assigned to Plastic Pallet Production, Inc. on a "Modular Pallet System"; and U.S. Pat. No. 5,791,262 patented Aug. 11, 1998 to J. Knight et al and assigned to The Fabri-Form Co. on a "Reinforced Plastic Pallet.

SUMMARY OF THE INVENTION

The present invention provides an improved mounting pad apparatus which is designed for the particular purpose of supporting and allowing the moving of an electrical power transformer which is secured thereto. The configuration includes a load supporting deck which extends generally horizontally and is adapted to support and electrical power transformer. The load supporting deck defines a deck access opening therein which facilitates electrical access from the environmental substrate therebelow to such an electrical power transformer positioned on the load supporting deck. Such access is normally electrical wiring and other electrical communication conduits which travel below ground in certain residential and commercial areas and need to be protected as they travel upwardly to electrically communicate with the electrical power transformer. As such, this deck access opening provides this protection and while at the same time providing access. The load support deck preferably will also include an attachment device thereon adapted to secure the electrical power transformer fixedly thereto.

A plurality of side walls extend downwardly from the load supporting deck about the periphery thereof in order to position the load supporting deck upwardly above the ground surface to protect the electrical power transformer secured thereon from water, dirt and other contaminating influences to which it might be exposed if it were positioned directly on the earthen substrate.

A base flange is secured to the side walls and extends outwardly therefrom to define a widened surface support lip in order to facilitate stable positioning of the load supporting deck and an electrical power transformer positioned thereon.

A cellular subframework is defined of rigid plastic material which extends below the load supporting deck and between the side walls for strengthening and stiffening of the load supporting deck to aid support of the electrical power transformer. The load supporting deck and the side walls and the base flange and the cellular subframework are preferably all formed as a single integral member of preferably a high density structural polyethylene foam material in order to facilitate the structural strength thereof. This cellular subframework member preferably defines a plurality of cellular voids therein for further strengthening thereof and for supporting the load supporting deck thereabove. The cellular subframework preferably defines a reinforcing slot defined therein to facilitate structural strengthening of the cellular subframework.

Preferably the reinforcing slot comprises a first set of reinforcing slots defined within the cellular subframework between the side walls means as well as a second set of reinforcing slots defined therein and extending generally perpendicular with respect to the first set of reinforcing slots for providing a manner of complementary reinforcing thereof.

The cellular subframework may further include a plurality of forklifting slots adaptable to receive conventional fork members from a forklift to facilitate movement and placement of the improved mounting pad apparatus as a single unit with the electrical power transformer mounted fixedly thereon. In the preferred configuration the forklifting slot will include two specific forklifting slots extending horizontally completely through the base flange, the side walls and the cellular subframework and through the base flange again as well as through the side wall means again. Preferably these two forklifting slots will extend parallel and will be spatially disposed with respect to one another at the conventional spacing of the fork of a standard forklift in order to facilitate this lifting and placing of the pad while loaded.

The cellular subframework preferably further includes a reinforcing opening in communication with respect to the reinforcing slot to facilitate removal and replacement of rigid bars selectively therewithin for stiffening of the cellular subframework and the load supporting deck carried thereby as desired.

A plurality of rigid bar members may also be included which are preferably made of aluminum and are selectively and removably positionable at multiple locations within the reinforcing slots in order to increase the overall strength and rigidity of the cellular subframework to facilitate supporting of an electrical power transformer thereon.

A plurality of detachable plates are also included which are selectively securable with respect to the cellular subframework adjacent the reinforcing opening defined therein in order to extend thereacross for selectively closing thereof to facilitate retaining of the rigid bar members located therein. The detachable plates are preferably secured to the cellular subframework therebelow and extend horizontally to facilitate abutting contact with the environmental substrate below.

A channel liner may also be included secured with respect to the cellular subframework within the forklifting slot. This channel liner is preferably formed of a material such as teflon or other slippery-type material which has a lower coefficient of friction than the high density structural polyethylene foam of the cellular subframework in order to facilitate engagement with respect to the forklifting slots by conventional forklifting arms for facilitating movement of a mounting pad apparatus while loaded with an electrical power transformer.

It is an object of the present invention to provide an improved mounting pad apparatus for supporting and moving an electrical power transformer while positioned thereon which allows movement of a mounting pad simultaneously with an electrical power transformer secured thereto to various locations where desired by a conventional forklift.

It is an object of the present invention to provide an improved mounting pad apparatus for supporting and moving an electrical power transformer while positioned thereon which provides access for multiple angles and locations from a forklift to facilitate moving of the transformer and mounting pad simultaneously.

It is an object of the present invention to provide an improved mounting pad apparatus for supporting and moving an electrical power transformer while positioned thereon which has no moving parts whatsoever.

It is an object of the present invention to provide an improved mounting pad apparatus for supporting and moving an electrical power transformer while positioned thereon which is easily maintained.

It is an object of the present invention to provide an improved mounting pad apparatus for supporting and moving an electrical power transformer while positioned thereon which is formed of a strong structural plastic material.

It is an object of the present invention to provide an improved mounting pad apparatus for supporting and moving an electrical power transformer while positioned thereon which can be formed of high density polyethylene foam material.

It is an object of the present invention to provide an improved mounting pad apparatus for supporting and moving an electrical power transformer while positioned thereon which defines forklifting slots at multiple locations to facilitate access for positioning in areas with limited accessibility.

It is an object of the present invention to provide an improved mounting pad apparatus for supporting and moving an electrical power transformer while positioned thereon which includes reinforcing rods positionable at various locations within openings defined therein for enhancing the structural strength thereof.

It is an object of the present invention to provide an improved mounting pad apparatus for supporting and moving an electrical power transformer while positioned thereon which allows removal and replacement of reinforcing rods at various locations for increasing the structural strength of the cellular subframework and the loading deck supported thereby.

It is an object of the present invention to provide an improved mounting pad apparatus for supporting and moving an electrical power transformer while positioned thereon which includes detachable covering means extending over the reinforcing rod openings to selectively secure the reinforcing rods in place within the reinforcing rod openings defined in the cellular subframework.

It is an object of the present invention to provide an improved mounting pad apparatus for supporting and moving an electrical power transformer while positioned thereon which includes covering means which secure the reinforcing rods in specific locations while at the same time increasing the footprint of the mounting pad against the environmental substrate to enhance the stability thereof.

It is an object of the present invention to provide an improved mounting pad apparatus for supporting and moving an electrical power transformer while positioned thereon which includes a horizontally extending flange at the lower periphery of the side walls to enhance stability of the pad when placed.

It is an object of the present invention to provide an improved mounting pad apparatus for supporting and moving an electrical power transformer while positioned thereon which spaces an electrical power transformer upwardly away from the ambient environmental substrate conditions to minimize the possibility of damaging or deterioration thereof.

It is an object of the present invention to provide an improved mounting pad apparatus for supporting and moving an electrical power transformer while positioned thereon which has minimum maintenance requirements.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENT

A mounting pad apparatus for supporting an electrical power transformer. This mounting pad 10 is also usable with the electrical power transformer secured thereto for movement of both units together with a conventional forklift. The improvement in this mounting pad apparatus is firstly in the ability for use of a forklift with the forklifting slots 40 thereof to facilitate easy movement of the mounting pad 10 and the electrical power transformer 12 as a unit while at the same time providing increased structural strength for the horizontally extending load support deck 14 by the inclusion of rigid bar members 44 movably positionable within reinforcing slots 34 defined in the cellular subframework 30 which supports the load support deck 14 thereabove.

The electrical power transformer 12 is defined to be mounted on the mounting pad 10 and in particular on the load supporting deck 14 thereof. This load supporting deck preferably extends horizontally and defines a deck access opening 16 therein. This deck access opening 16 allows electrical lines to extend from the electrical power transformer 12 downwardly into the environmental substrate 18 therebelow. Normally this environmental substrate will be ground, earth, asphalt or cement in order to allow the electrical power transformer 12 to electrically communicate with respect to underground wiring commonly utilized currently in residential and commercial locations. The load supporting deck 14 will be positioned spaced upwardly from the environmental substrate 18 by side walls 22 which preferably will extend downwardly from the periphery 24 of the deck 14.

The side walls 22 will extend downwardly to a base flange 26 which includes a widened support surface lip 28 which extends outwardly therefrom. This widened support surface lip 28 will increase the footprint of the mounting pad 10 and, as such, enhance the stability of positioning thereof upon the environmental substrate 18.

An attachment means 20 such as a plurality of apertures, holes, slots or other attachment members can be included with the mounting pad 10 or the electrical power transformer 12 for fixedly securing pad 10 and transformer 12 together. As shown in the figures of the invention, the mounting pad 10 will preferably define holes or slots as these attachment members 20 to enhance the ability for attaching therebetween.

The strength of the load supporting deck 14 is extremely important since the electrical power transformers 12 used in such applications are normally extremely heavy. The strength of the load supporting deck 14 is enhanced by the use of a cellular subframework 30 which defines a plurality of cellular voids 32 therein. It is also important that the material from which the mounting pad 10 is made does not deteriorate under extreme weather conditions such as freezing, heat, rain, snow, etc. This is because these applications are almost always located in the external ambient environment and deterioration is an important consideration. As such, external metal members are normally not used because they tend to deteriorate over time. As such, plastic is normally used for the material of such mounting pads 10 arid, since plastic is normally not as strong as metal, strength becomes an important consideration. For this reason the cellular subframework 30 with the cellular voids 32 is formed of the plastic material. Normally the plastic chosen is a high density structural polyethylene foam material which when formed with the cellular subframework 30 provides a significantly strong mounting pad which is almost impervious to external environmental conditions.

The strengthening of such a mounting pad is extremely important, however, and for this purpose a plurality of reinforcing slots 34 are preferably defined in the cellular subframework 30 therebelow. These reinforcing slots are preferably adapted to receive rigid bar members 44 therewithin such as aluminum bars to facilitate strengthening of the cellular framework 30 and strengthening of the load supporting deck 14 thereabove.

In the preferred configuration the reinforcing slots 34 define a first set of reinforcing slots 36 extending parallel with respect to one another defined in the cellular subframework 30 and a second set of reinforcing slots 38 generally parallel with respect to one another and perpendicular with respect to the first set of reinforcing slots 36 for complementary strengthening therebetween. That is, by the positioning of rigid bar members 44 within the first set of reinforcing slots 36 simultaneously with positioning of rigid bar members 44 within the second set of reinforcing slots 38, the combination of the use of aluminum within the plastic external housing as well as the positioning of these reinforcing aluminum rods or bars 44 perpendicular with respect to one another provides a significant strengthening aspect to the mounting pac 10. Also under various environmental or specific applications it may be desirable to increase the strength in one direction or another, that is, within one orientation or another of the loading supporting deck 14 and the cellular subframework 30. In these applications one or more rigid bars 44 can be positioned within one or more of the reinforcing slots 36 or 38 as desired in the particular application. This is only possible due to the fact that the rigid bar members 44 are easily removable from the cellular subframework 30 as described below. To facilitate the removability of the reinforcing bars a plurality of reinforcing opening means 42 are defined in the lowermost surface of the cellular subframework 30. These reinforcing opening means 42 are in communication with the reinforcing slots 36 and 38 and, as such, allow the rigid bar members 44 to be easily placed in the reinforcing slots. The reinforcing opening means comprise the openings defined in the cellular subframework 30 which provide direct access into the reinforcing slots 36 and 38. Reinforcing opening means 42 basically comprise openings in this cellular framework which communicate directly into the channels defined therein for holding reinforcing members therein. By movement of the rigid bar members 44 through the reinforcing openings 42 they can be removed or replaced as desired for additional strengthening of the first and second set of reinforcing slots 36 and 38 as necessary. In this manner conservation of weight and conservation of aluminum can be achieved since only enough stiffening need be utilized as is required for a particular application. In some applications no rigid bar members 44 may be needed whatsoever. Such applications might be where the electrical power transformer 12 is very small and is of limited weight and therefore strengthening beyond the basic strength of the load supporting deck 14 and the cellular subframework 30 is not necessary. However, for applications for supporting larger transformers 12 additional reinforcing may be required to the maximum extent wherein a rigid bar member 44 is positioned in each and every one of the reinforcing slots 34 defined in the undersurface of the cellular subframework 30.

A plurality of detachable plate members 46 may be securable with respect to the undersurface of the cellular subframework 30 in such a manner as to be able to extend over the reinforcing opening means 42 for closing thereof and therefore fixedly retaining any rigid bar members 44 in position within the reinforcing slots 34 where they are located. These detachable plate members 46 can be secured such as by stainless steel screws or other attachment means which can be easily attached and detached as desired to facilitate removal and replacement or relocation of the rigid bar members 44 within the reinforcing slots 34 as desired.

The forklifting slots 40 of the present invention can include a channel liner 48 extending therein. Such a channel liner 48 is preferably of a more slippery material. That is, a material having a higher coefficient of friction than the plastic of the mounting pad 10 itself. Such material may also have increased wear characteristics to facilitate movement of the arms of a conventional forklift into the channels or forklifting slots 40 and facilitate lifting and movement of the mounting pad 10 and the electrical power transformer 12 as a unit as desired.

Figures 1, 2:
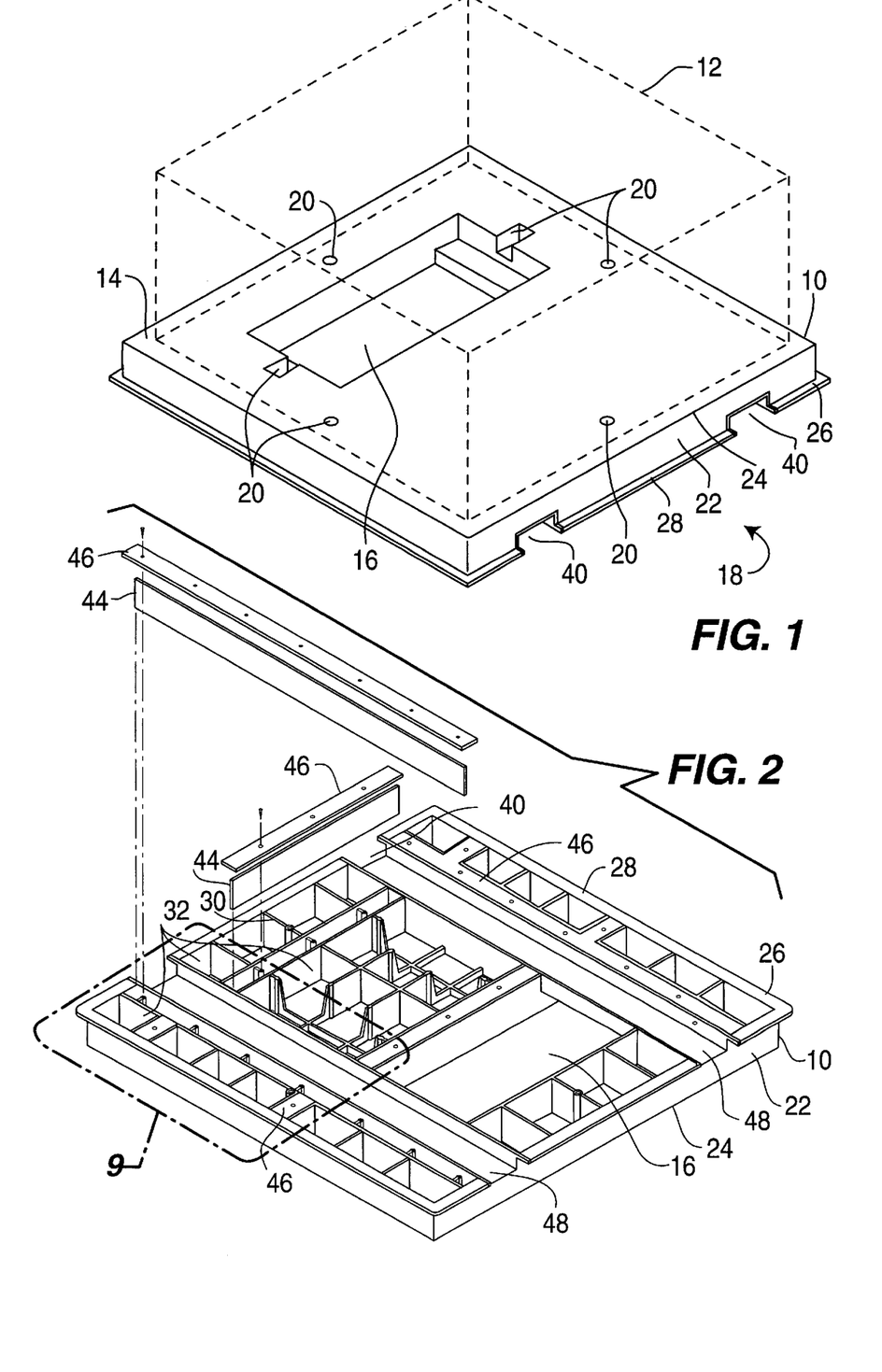
FIG. 1 is a top perspective illustration of an embodiment of the improved mounting pad apparatus of the present invention showing an electrical power transformer in phantom outline mounted thereon.
FIG. 2 is a perspective illustration of the undersurface of the embodiment of the device shown in FIG. 1.
Figure 3:
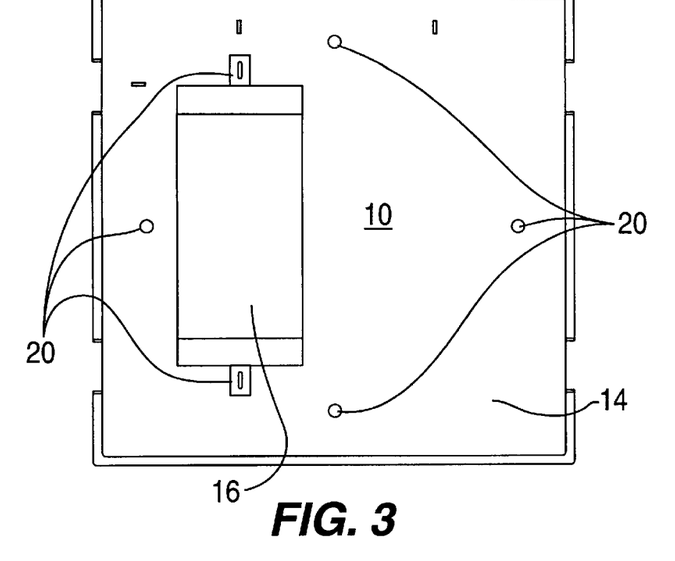
FIG. 3 is a top plan view of the embodiment shown in FIG. 1.
Figure 4:
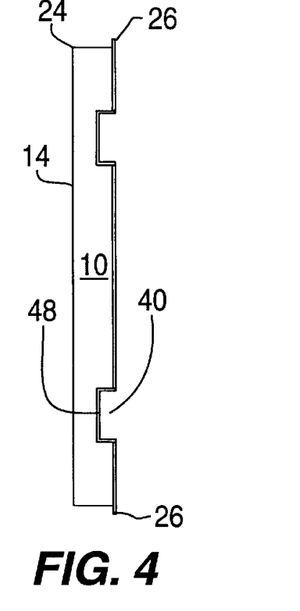
FIG. 4 is a top plan view of the embodiment shown in FIG. 1.
Figure 5:
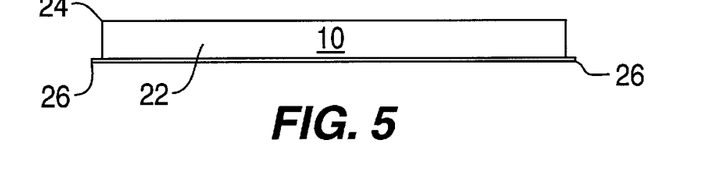
FIG. 5 is a side plan view of the embodiment shown in FIG. 1.
Figure 6:
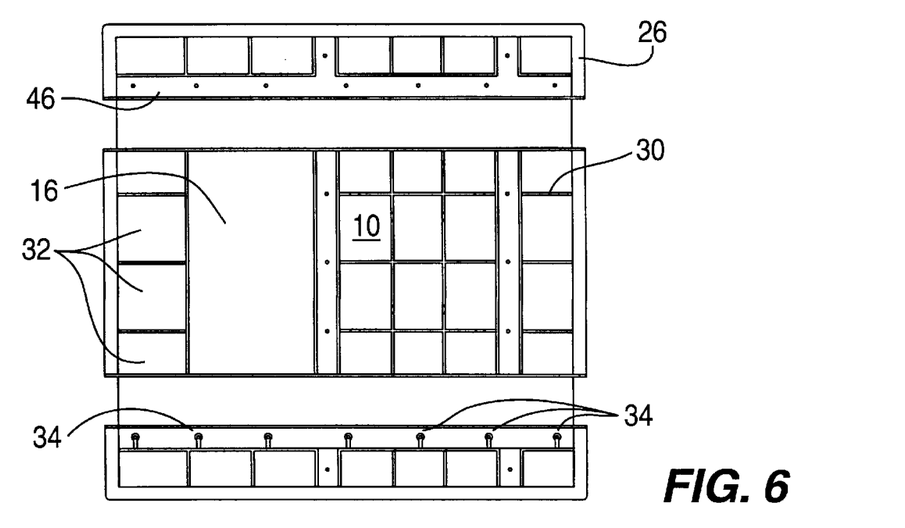
FIG. 6 is a bottom plan view of the embodiment shown in FIG. 1.

In the first configuration as shown best in FIG. 6 the forklifting slot 40 will comprise two individual slots spaced apart from one another of conventional spacing distance of forklifting arms and will extend completely through the cellular subframework 30 and through the side wall 22 and base flange 26 on each end thereof. In this manner the support and movement of the electrical power transformer 12 while mounted on the mounting pad 10 will be achievable.

Figure 7:
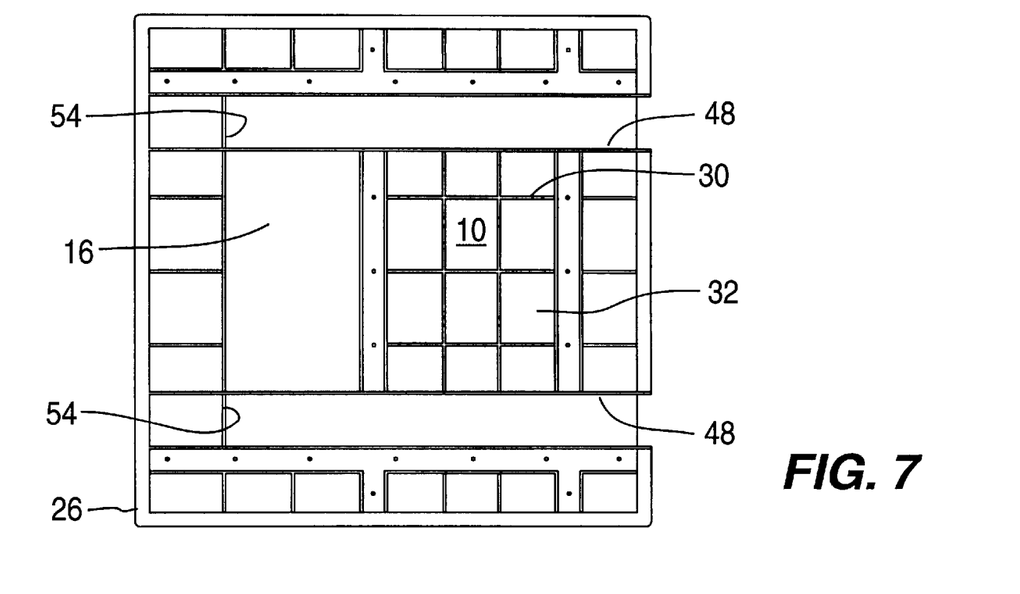
FIG. 7 is an alternative embodiment of the improved mounting pad apparatus of the present invention showing truncated forklifting slots.

In an alternative configuration it may be necessary to provide truncated forklift slot means 40 as shown in FIG. 7. Those slots do not extend entirely through the cellular subframework 30. With the FIG. 7 configuration the forklifting slots 40 will terminate at the end walls 54 thereof at an intermediate position within the cellular subframework 30. Such a configuration may be necessary where a very heavy electrical power transformer 12 is utilized and an increase in the widened support surface lip 28 of the base flange 26 is desired along the rearmost edge thereof.

Figure 8:
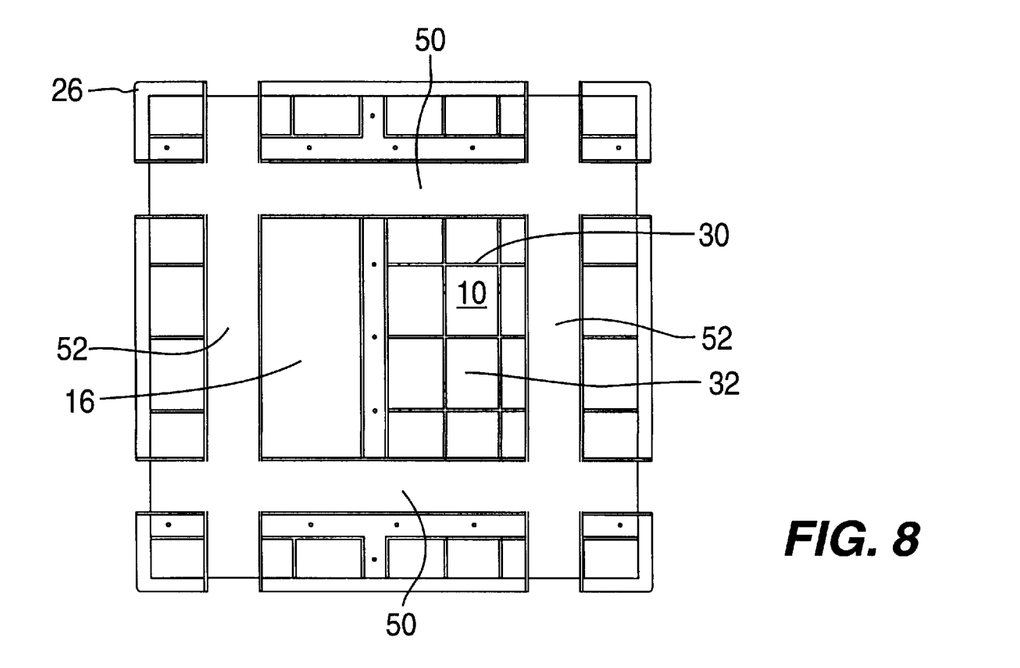
FIG. 8 is another alternative embodiment of the improved mounting pad apparatus of the present invention showing multiple forklift mounting slots oriented perpendicularly with respect to one another to facilitate access in limited accessibility applications.
Figure 9:
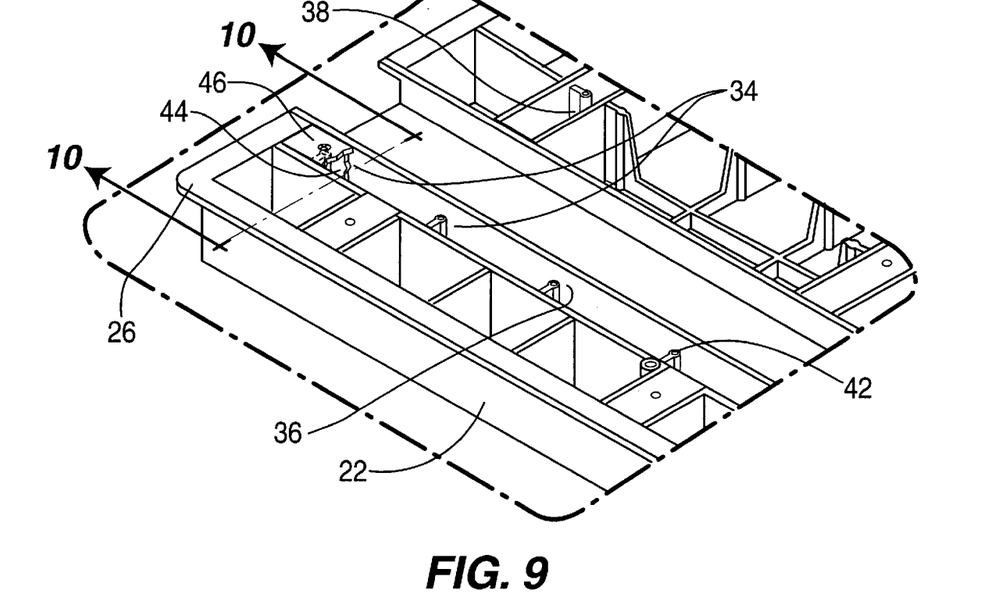
FIG. 9 is an exploded view of a section of FIG. 2 as shown as area 9.
Figure 10:
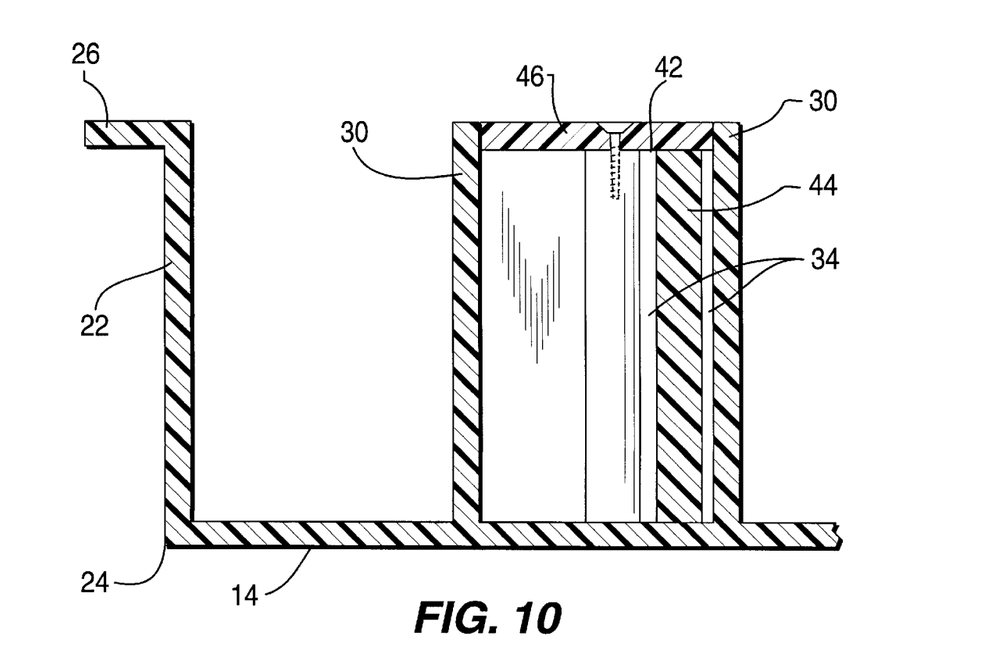
FIG. 10 is a side cross-sectional view of an embodiment of the improved mounting pad apparatus of the present invention showing a reinforcing bar member retained at a location therewithin.

Another alternative configuration for the forklifting slot means 40 is as shown in FIG. 8. FIG. 8 shows a first pair of forklifting slots 50 extending completely through the cellular subframework 30 and the base flange 26 as well as the side wall 22 from one end to another in the lateral direction. A second pair of forklifting slots 52 are similarly configured and they extend through the mounting pad 10 in the longitudinal direction. In this manner the configuration of the forklifting slot means 40 will include a first pair of forklifting slot means 50 with a second pair of forklifting slot means 52 extending perpendicular thereto. In the preferred configuration the first pair of forklifting slot means 50 will be parallel with respect to one another. Similarly the second pair of forklifting slot means 52 will be parallel with respect to one another. Also the second pair of forklifting slot means 52 will be perpendicular with respect to the first pair of forklifting slot means 50 to provide the overall configuration as shown in FIG. 8.

None of the prior art known to the applicant shows the combination of purposes of the present invention wherein ease of use with a forklift with multiple forklifting slot configurations defined in the mounting pad 10 are as shown. Also the present invention is an advancement over the prior art in the use of reinforcing rigid bar members 44 which are movable and removable at various reinforcing slots defined in the cellular subframework 30 and are securable therein by the attachment of detachable plate members 46 selectively as desired. Also the detachable plate members 46 increase the footprint of the mounting pad 10 to increase the stability thereof.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. An improved mounting pad apparatus for supporting and facilitating moving an electrical power transformer while positioned thereon comprising:

A. a load supporting deck means extending generally horizontally and adapted to support an electrical power transformer thereon, said load supporting deck means defining a deck access opening means therein to facilitate electrical access from an environmental substrate therebelow to an electrical power transformer adapted to be positioned on said load supporting deck means;

B. a plurality of side wall means secured to said load supporting deck means about the periphery thereof and extending downwardly therefrom for upwardly spacing of said load supporting deck and an electrical power transformer positioned thereon;

C. a base flange means secured to said side wall means and extending outwardly therefrom and defining a widened support surface lip to facilitate stable positioning of said load supporting deck means and an electrical power transformer positioned thereon upon an environmental substrate therebelow;

D. a cellular subframework of rigid plastic material extending below said load supporting deck means and between said side wall means for strengthening and stiffening of said load supporting deck means to facilitate support of an electrical power transformer thereon, said cellular subframework member defining a plurality of cellular voids therein for further strengthening thereof and for supporting said load supporting deck means thereabove, said cellular subframework defining a plurality of reinforcing slot means defined therein to facilitate structural strengthening of said cellular subframework, said cellular subframework defining a plurality of reinforcing opening means each being in communication with respect to one of said reinforcing slot means to facilitate access selectively therewithin;

E. a plurality of detachable plate means each being selectively securable with respect to said cellular subframework at one of said reinforcing opening means defined therein to extend thereacross for closing one of said reinforcing slot means to facilitate retaining therewithin, each of said detachable plate means being detachably positionable extending across said reinforcing slot means to further facilitate stabilizing of support of said cellular subframework upon an environmental substrate therebelow; and F. a plurality of rigid bar means each being selectively and removably repositionable within one of said reinforcing slot means to be selectively retained therein by said detachable plate means in order to increase the overall strength and rigidity of said cellular subframework to facilitate supporting of an electrical power transformer thereon.

2. An improved mounting pad apparatus for supporting and facilitating moving an electrical power transformer while positioned thereon as defined in claim 1 further defining a forklifting slot means defined in said cellular subframework adapted to be engageable therewithin to facilitate movement and placement of the improved mounting pad apparatus with an electrical power transformer positioned thereon.

3. An improved mounting pad apparatus for supporting and facilitating moving an electrical power transformer while positioned thereon as defined in claim 2 wherein said forklifting slot means comprises two forklifting slots defined in said cellular subframework means, said side wall means and said base flange means, said two forklifting slots extending parallel and spatially disposed from one another to facilitate lifting and placing of the improved mounting pad while loaded.

4. An improved mounting pad apparatus for supporting and facilitating moving an electrical power transformer while positioned thereon as defined in claim 3 wherein said two forklifting slots extend, horizontally completely through said base flange means and said side wall means and said cellular subframework and through said side wall means and said base flange means again.

5. An improved mounting pad apparatus for supporting and facilitating moving an electrical power transformer while positioned thereon as defined in claim 3 wherein said two forklifting slots extend horizontally through base flange means and said side wall means and only partially through said cellular subframework.

6. An improved mounting pad apparatus for supporting and facilitating moving an electrical power transformer while positioned thereon as defined in claim 2 wherein said forklifting slot means comprises a first pair of forklifting slots extending approximately parallel to one another and horizontally completely through said base flange means and said side wall means and said cellular subframework and outwardly through said side wall means and said base flange means again, said forklifting slot means further comprising a second pair of forklifting slots extending approximately parallel to one another and horizontally completely through said base flange means and said side wall means and said cellular subframework and outwardly through said side wall means and said base flange means again, said second pair of forklifting slots extending generally perpendicular with respect to said first pair of forklifting slots.

7. An improved mounting pad apparatus for supporting and facilitating moving an electrical power transformer while positioned thereon as defined in claim 1 wherein said reinforcing slot means includes a first set of reinforcing slots defined within said cellular subframework means and between said side wall means, said reinforcing slot means further including a second set of reinforcing slots defined within said cellular subframework means and between said side wall means and extending generally perpendicular with respect to said first set of reinforcing slots for complementary reinforcing thereof.

8. An improved mounting pad apparatus for supporting and facilitating moving an electrical power transformer while positioned thereon as defined in claim 7 wherein said rigid bar means includes a plurality of rigid bar members being selectively positionable within said first set of reinforcing slots and said second set of reinforcing slots for customizing of the strength and weight of the mounting pad apparatus as desired.

9. An improved mounting pad apparatus for supporting and facilitating moving an electrical power transformer while positioned thereon as defined in claim 1 wherein said detachable plate means is secured to said cellular subframework therebelow to facilitate abutting contact with the environmental substrate therebelow.

10. An improved mounting pad apparatus for supporting and facilitating moving an electrical power transformer while positioned thereon as defined in claim 1 wherein said rigid bar means is made of aluminum.

11. An improved mounting pad apparatus for supporting and facilitating moving an electrical power transformer while positioned thereon as defined in claim 1 wherein said rigid bar means is rectangular in cross-section with a height at least five times the width thereof to enhance structural stability and stiffness of said load supporting deck means positioned thereabove.

12. An improved mounting pad apparatus for supporting and facilitating moving an electrical power transformer while positioned thereon as defined in claim 1 wherein said load supporting deck means and said side wall means and said base flange means and said cellular subframework are formed as a single integral member of plastic material to facilitate structural strength and forming thereof.

13. An improved mounting pad apparatus for supporting and facilitating moving an electrical power transformer while positioned thereon as defined in claim 2 further comprising a channel liner means secured to said cellular subframework within said forklifting slot means defined therein, said channel liner means being formed of a material having a lower coefficient of friction than the plastic of said cellular subframework in order to facilitate engagement with respect to said forklifting slot means for facilitating movement of a loaded mounting pad apparatus.

14. An improved mounting pad apparatus for supporting and facilitating moving an electrical power transformer while positioned thereon as defined in claim 1 wherein said cellular subframework means is made of high density polyethylene structural foam.

15. An improved mounting pad apparatus for supporting and facilitating moving an electrical power transformer while positioned thereon as defined in claim 1 wherein said load supporting deck means defines an attachment means thereon to facilitate selective securement of an electrical power transformer thereto.

16. An improved mounting pad apparatus for supporting and facilitating moving an electrical power transformer while positioned thereon as defined in claim 8 wherein said cellular framework means defines a pair of forklifting slot means therein extending generally parallel with respect to one another and wherein said first set of reinforcing slots extend in a direction generally perpendicular to said pair of forklifting slot means and are positioned therebetween and wherein said second set of reinforcing slots extend generally parallel to said pair of forklifting slot means and are located within said cellular frame means laterally outside of said reinforcing slot means to facilitate strengthening of said cellular framework both laterally and longitudinally responsive to said rigid bar means being placed within said first set of reinforcing slots and said second set of reinforcing slots oriented approximately perpendicular with respect to one another.

* * * * *